United States Patent Office 3,706,711
Patented Dec. 19, 1972

3,706,711
PROCESS FOR THE MANUFACTURE OF HIGHLY POLYMERIC POLYESTERS UTILIZING SAMARIUM COMPOUND CATALYSTS
André Jan Conix, Antwerp, and Lambert Gaston Jeurissen, Mortsel, Belgium, assignors to Gevaert-Agfa N.V., Mortsel, Belgium
No Drawing. Filed Apr. 10, 1968, Ser. No. 720,400
Claims priority, application Great Britain, May 8, 1967, 21,291/67
Int. Cl. C08g 17/01, 17/013
U.S. Cl. 260—75 C    4 Claims

ABSTRACT OF THE DISCLOSURE

A process for the manufacture of highly polymeric fiber and film-forming polyesters comprising polycondensing a glycol dicarboxylate in the presence of a catalytic amount of a samarium compound is described. Only a small amount of the samarium compound is required, resulting in polyesters having good color.

---

This invention relates to improvements in the manufacture of polyesters, in particular highly polymeric polyethylene terephthalate.

Highly polymeric polyethylene terephthalate is widely used as fibre- and film-forming material. In general it is made by an ester-interchange reaction between an ester of terephthalic acid and ethylene glycol whereby bis(beta-hydroxy-ethyl)terephthalate is formed. This compound is then polycondensed under reduced pressure and at high temperature.

The prior art contains a large number of disclosures concerning the use of catalysts in the manufacture of fibre- and film-forming linear condensation type polyesters. Among numerous useful catalysts for preparing polyesters are zinc acetate, antimony trioxide, titanium compounds and compounds of other metals.

According to the invention an improved process is provided for the manufacture of highly polymeric polyesters, obtained by reacting a glycol with an aromatic dicarboxylic acid or an ester-forming derivative thereof such as the dimethyl ester of the aromatic dicarboxylic acid, i.e. a derivative which forms a hydroxy ester by reaction with the glycol, e.g. by ester-interchange, and polycondensing the resulting glycol dicarboxylate, characterized in that at least during the polycondensation step a samarium compound is present.

Among the samarium compounds which are suited for being used as polycondensation catalysts according to the invention can be named samarium oxides, inorganic samarium salts such as the samarium halides (chloride, bromide, fluoride, and iodide), samarium nitrate, sulphate, carbonate, bromate, phosphate, ethylsulphate, organic salts such as samarium acetate, the phthalates, oxalate, sorbate, lactate; and other compounds such as smarium acetylacetonate, benzoyl acetonate, glycolate, oxychloride.

The manufacture of these and other samarium compounds is described by Pascal in Nouveau Traité de Chimie Minérale, Tome VII, second part.

These samarium compounds are useful for the catalysis of both the ester-interchange and the polycondensation reaction.

If preferred, another ester-interchange catalyst such as e.g. zinc acetate, or a mixture of such substances may be used as the ester-interchange catalyst, the samarium compounds of the invention being used as the polycondensation catalysts. Alternatively, the samarium compounds may be used as catalysts in the polycondensation step, together with other known polycondensation catalysts or mixtures thereof.

Small amounts of samarium compounds according to the invention suffice to effectively catalyse the polycondensation reaction. As the colouration of the polyesters is in general proportional to the total amount of catalyst added, and since according to the invention a very small quantity of samarium catalysts suffices, polyesters of less colouration are obtained.

In contrast with the above, antimony catalysts give polyesters having relatively low melting points. They also have relatively slow action. The samarium compounds of the present invention are, however, much more active in catalysing the polycondensation reaction and at the same time give polyesters with much higher melting points indicating a low diethylene glycol content, and resulting in a higher modulus of elasticity of the films manufactured from the polyesters thus obtained.

The description and examples are especially directed to the use of the novel catalysts in the preparation of polyethylene terephthalate. This preparation consists in an ester-interchange step followed by a polycondensation step. The novel catalysts should at least be present during the polycondensation step.

The samarium compounds, however, can be employed as polycondensation catalysts in the preparation of other polyesters too. These polyesters are also formed by an ester-interchange step followed by a polycondensation step. In the ester-interchange step a glycol or a mixture of glycols is reacted with an ester of a dicarboxylic acid other than terephthalic acid, e.g. a pyridine-dicarboxylic acid ester, or with a mixture of esters of dicarboxylic acids. In the above the term glycol is to be taken in its broadest sense and includes all dihydric alcohols such as e.g. cyclohexane dimethanol.

The samarium compounds may also be used as catalysts during a polycondensation step which has been preceded by a simple esterification reaction between a dicarboxylic acid or a mixture of dicarboxylic acids and a glycol or mixtures of glycols.

The samarium compounds do not interfere with known stabilizing agents such as phosphates or phosphites which may conventionally be added to the polycondensation reaction mixture.

The following examples illustrate the invention. In the examples the inherent viscosity $\eta_{inh}$, which is a measure of the degree of polycondensation, has been calculated from the equation:

$$\eta_{inh} = \frac{\ln \eta_{rel}}{c}$$

wherein $\eta_{rel}$ is the relative viscosity and equals the ratio $\frac{\text{flow time of solution}}{\text{flow time of solvent}}$, and c is the concentration $\eta_{rel}$ was determined at 25° C. for a solution having a concentration c of 0.5 g. of polyester per 100 ccs. of a 60:40 mixture of phenol and sym.-tetrachloroethane.

The crystalline melting point was determined by heating a crystallized sample of polyester on the heating stage of a polarizing microscope. The temperature of the hot stage was raised at a rate of 0.8° C./min. The crystalline melting point was obtained by noting the temperature at which the last trace of birefringence disappears between crossed nicols.

The colour of the molten polyester was measured in a Lovibond Tintometer and recorded in terms of the Lovibond scale. This scale consists of permanent glass filters graduated in a strictly linear scale, from the palest perceptible colour to a fully saturated one, in the three subtractive primary colours red, yellow and blue. By selecting suitable combinations from these scales, any colour, as

EXAMPLE 1

38.8 g. of dimethylterephthalate and 27.3 g. of ethylene glycol are placed in a glass polymerization tube of 25 millimeter inside diameter, whereupon 8.0 mg. of samarium acetate tetrahydrate ($1.10^{-4}$ mole/mole of dimethyl terephthalate) are added. The reactants are heated for 2½ h. at 197° C. at atmospheric pressure while a continuous stream of oxygen-free dry nitrogen is introduced through a capillary tube reaching to the bottom of the reaction tube. The ester-interchange being finished, the temperature is gradually raised over 30 minutes to 282° C. and the unreacted ethylene glycol distilled. The pressure is reduced to 0.1 to 0.3 millimeter of mercury while the reaction mass is stirred under oxygen-free dry nitrogen. After 3 h. at 282° C., vacuum is released and polyethylene terephthalate polyester is obtained having an inherent viscosity of 0.62 dl./g. The polyester is clear, has a Lovibond colour combination of 0.6 red and 2.6 yellow, and melts at 268° C., which indicates a very low diethylene glycol content.

EXAMPLE 2

38.8 g. of dimethyl terephthalate and 27 g. of ethylene glycol are placed in a glass polymerization tube of 25 millimeter inside diameter, whereupon 7.0 mg. of samarium trioxide ($1.10^{-4}$ mole/mole of dimethyl terephthalate) are added. The reactants are heated for 3 h. at 197° C. at atmospheric pressure while a continuous stream of oxygen-free dry nitrogen is introduced through a capillary tube reaching to the bottom of the reaction tube. The ester interchange being finished, the temperature is gradually raised over 30 minutes to 282° C. and the unreacted ethylene glycol distilled. The pressure is reduced to 0.1 to 0.3 millimeter of mercury while the reaction mass is stirred under oxygen-free dry nitrogen. After 3 h. at 282° C., vacuum is released and polyethylene terephthalate polyester is obtained having an inherent viscosity of 0.63 dl./g. The polyester is clear, has a Lovibond colour combination of 0.5 red and 2.8 yellow, and melts at 268.5° C., which indicates a very low diethylene glycol content.

EXAMPLE 3

38.8 g. of dimethyl terephthalate and 27 g. of ethylene glycol are placed in a glass polymerization tube of 25 millimeter inside diameter, whereupon 3.5 mg. of samarium trioxide ($5.10^{-5}$ mole/mole of dimethyl terephthalate) are added. The reactants are heated for 3 h. at 197° C. at atmospheric pressure while a continuous stream of oxygen-free dry nitrogen is introduced through a capillary tube reaching to the bottom of the reaction tube. The ester-interchange being finished, the temperature is gradually raised over 30 minutes to 282° C. and the unreacted ethylene glycol distilled. The pressure is reduced to 0.1 to 0.3 millimeter of mercury while the reaction mass is stirred under oxygen-free dry nitrogen. After 4 h. at 282° C., vacuum is released and polyethylene terephthalate polyester is obtained having an inherent viscosity of 0.615 dl./g. The polyester is clear, has a Lovibond colour combination of 0.7 red and 2.9 yellow, and melts at 268.5° C., which indicates a very low diethylene glycol content.

EXAMPLE 4

38.8 g. of dimethyl terephthalate and 27 g. of ethylene glycol are placed in a glass polymerization tube of 25 millimeter inside diameter, whereupon 2.1 mg. of samarium trioxide ($3.10^{-5}$ mole/mole of dimethyl terephthalate) are added. The reactants are heated for 3½ h. at 197° C. at atmospheric pressure while a continuous stream of oxygen-free dry nitrogen in introduced through a capillary tube reaching to the bottom of the reaction tube. The ester-interchange being finished, the temperature is gradually raised over 30 minutes to 282° C. and the unreacted ethylene glycol distilled. The pressure is reduced to 0.1 to 0.3 millimeter of mercury while the reaction mass is stirred under oxygen-free dry nitrogen. After 6 h. at 282° C. vacuum is released and polyethylene terephthalate polyester is obtained having an inherent viscosity of 0.61 dl./g. The polyester is clear, has a Lovibond colour combination of 2.0 yellow and 0.3 red, and melts at 268.5° C., which indicates a very low diethylene glycol content.

EXAMPLE 5

38.8 g. of dimethyl terephthalate and 27.3 g. of ethylene glycol are placed in a glass polymerization tube of 25 millimeter inside diameter, whereupon 8.9 mg. of samarium acetylacetonate ($1.10^{-4}$ mole/mole of dimethyl terephthalate) are added. The reactants are heated for 3 h. at 197° C. at atmospheric pressure while a continuous stream of oxygen-free dry nitrogen is introduced through a capillary tube reaching to the bottom of the reaction tube. The ester-interchange being finished, the temperature is gradually raised over 30 minutes to 282° C. and the unreacted ethylene glycol distilled. The pressure is reduced to 0.1 to 0.3 millimeter of mercury while the reaction mass is stirred under oxygen-free dry nitrogen. After 3 h. at 282° C. vacuum is released and polyethylene terephthalate polyester is obtained having an inherent viscosity of 0.65 dl./g. The polyester is clear, has a Lovibond colour combination of 0.7 red and 2.4 yellow and melts at 267° C., which indicates a very low diethylene glycol content.

We claim:

1. A process for the manufacture of highly polymeric fiber and film-forming polyesters comprising the steps of providing a glycol terephthalate and polycondensing said glycol terephthalate in the presence of a catalytic amount of a polycondensation catalyst which is a samarium compound selected from the group consisting of samarium oxide, halide, nitrate, sulphate, carbonate, phthalate, oxalate, sorbate, lactate, acetylacetonate, benzoylacetonate, acetate, glycolate, and oxychloride.

2. A process for the manufacture of highly polymeric fiber and film-forming polyesters comprising the steps of providing a glycol dicarboxylate and polycondensing said glycol dicarboxylate in the presence of a catalytic amount of a polycondensation catalyst which is samarium trioxide.

3. A process for the manufacture of highly polymeric fiber and film-forming polyesters comprising the steps of providing a glycol dicarboxylate and polycondensing said glycol dicarboxylate in the presence of a catalytic amount of a polycondensation catalyst which is samarium acetate tetrahydrate.

4. The process according to claim 1 wherein the glycol terephtalate is bis(2-hydroxyethyl)terephthalate.

References Cited

UNITED STATES PATENTS

| 3,166,431 | 1/1965 | Mullaly | 106—264 |
| 3,254,103 | 5/1966 | Melby et al. | 260—429.2 |
| 3,344,091 | 9/1967 | Russin et al. | 260—2.3 |
| 2,465,319 | 3/1949 | Whinfield et al. | 260—75 |

WILLIAM H. SHORT, Primary Examiner

L. L. LEE, Assistant Examiner